(12) United States Patent
Kim et al.

(10) Patent No.: US 10,204,874 B2
(45) Date of Patent: Feb. 12, 2019

(54) INTEGRATED CIRCUIT CHIP WITH REVERSE ENGINEERING PREVENTION

(71) Applicant: Korea University Research and Business Foundation, Seoul (KR)

(72) Inventors: Seung Joo Kim, Seoul (KR); Kyungsuk Yi, Gyeonggi-do (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 15/641,603

(22) Filed: Jul. 5, 2017

(65) Prior Publication Data

US 2018/0012849 A1 Jan. 11, 2018

(30) Foreign Application Priority Data

Jul. 5, 2016 (KR) ........................ 10-2016-0084835

(51) Int. Cl.
| | |
|---|---|
| *H01L 23/00* | (2006.01) |
| *H03K 3/023* | (2006.01) |
| *H03K 3/027* | (2006.01) |
| *H03K 19/177* | (2006.01) |
| *G06F 21/75* | (2013.01) |

(52) U.S. Cl.
CPC ............ *H01L 23/576* (2013.01); *G06F 21/75* (2013.01); *H03K 3/023* (2013.01); *H03K 3/027* (2013.01); *H03K 19/17768* (2013.01)

(58) Field of Classification Search
CPC ...... H01L 23/576; H03K 3/023; H03K 3/027; H03K 19/17768

USPC ............................................................ 326/8
See application file for complete search history.

(56) References Cited

U.S. PATENT DOCUMENTS

| | | | | |
|---|---|---|---|---|
| 6,962,294 | B2 * | 11/2005 | Beit-Grogger ........ | H01L 23/576 235/487 |
| 7,474,612 | B1 * | 1/2009 | Patel ....................... | H04J 3/062 370/217 |
| 8,296,845 | B2 * | 10/2012 | Derouet .................. | G06F 21/87 713/500 |
| 2008/0244749 | A1 * | 10/2008 | Derouet .................. | G06F 21/87 726/25 |

FOREIGN PATENT DOCUMENTS

| | | |
|---|---|---|
| JP | H11284612 A | 10/1999 |
| KR | 20050033780 A | 4/2005 |
| KR | 20080087542 A | 10/2008 |

* cited by examiner

*Primary Examiner* — Daniel D Chang
(74) *Attorney, Agent, or Firm* — Hauptman Ham, LLP (57) ABSTRACT

An integrated circuit chip with reverse engineering prevention includes: a signal generator part configured to generate a first signal; a metal line part configured to receive the first signal generated at the signal generator part and generate a second signal; a comparison logic part configured to compare the first signal generated at the signal generator part and the second signal generated at the metal line part; and a signal routing part formed on both sides of the metal line part to connect the signal generator part with the metal line part at one side and connect the metal line part with the comparison logic part at the other side, where the signal routing part is a shift register.

6 Claims, 7 Drawing Sheets

INTEGRATED CIRCUIT CHIP WITH REVERSE ENGINEERING PREVENTION

CROSS-REFERENCE TO RELATED APPLICATIONS

This application claims the benefit of Korean Patent Application No. 10-2016-0084835, filed with the Korean Intellectual Property Office on Jul. 5, 2016, the disclosure of which is incorporated herein by reference in its entirety.

BACKGROUND

1. Technical Field

The present solution relates to an integrated circuit chip with reverse engineering prevention, more particularly to an integrated circuit chip that can increase security in terms of preventing reverse engineering while minimizing the size of the circuit.

2. Description of the Related Art

Generally, the structure of a silicon chip forming an integrated circuit may include transistors and metal layers. The metal layers connect transistors as digital logic devices that enable the silicon chip to function as a processor or an encryption engine. Various methods can be used to obtain information regarding the silicon chip from the chip itself, and in an integrated circuit used in a smart card in particular, an attacker may use information obtained from analyzing, or reverse engineering, the integrated circuit to alter the operation mode of the circuit or manipulate the data stored in the memory.

Such methods can incur undesired results, especially in security-related circuits associated with ATM card functions or access-control functions.

An attacker may evade the active shield of an integrated circuit and hack into the integrated circuit by using a FIB (focused ion beam) method, a probing method, or a forcing method. The FIB (focused ion beam) method is a method of arbitrarily shorting or connecting metal lines. The probing method refers to cutting a particular metal line of the active shield by way of the FIB method and then reading the state value of the cut metal line. Forcing refers to the act of manipulating data by cutting a particular metal line of the active shield by way of the FIB method and then providing a particular signal to the cut metal line.

It is not impossible to identify the security structure within a silicon chip by reverse engineering the chip, and a probe attack can be used to acquire useful information such as personal information and password keys. Because of this, the security structure of a chip may be located at a lower layer of the chip to prevent probing attaches to security-related block engines such as those based on the data encryption standard (DES), the advanced encryption standard (AES), and the RSA cryptosystem.

To prevent probe attacks to the security structure of a silicon chip, it has become very important to add a silicon surface protective layer onto the surface of the chip. However, adding a separate layer to the silicon chip may pose a burden on the manufacturer due to the increase in overall cost, increase in difficulty of the manufacture itself, etc. This may also increase the size of the chip, running contrary to the condition of minimized size required as an inherent property of a chip, and may further present difficulties in terms of the chip's efficiency.

Figure 1:
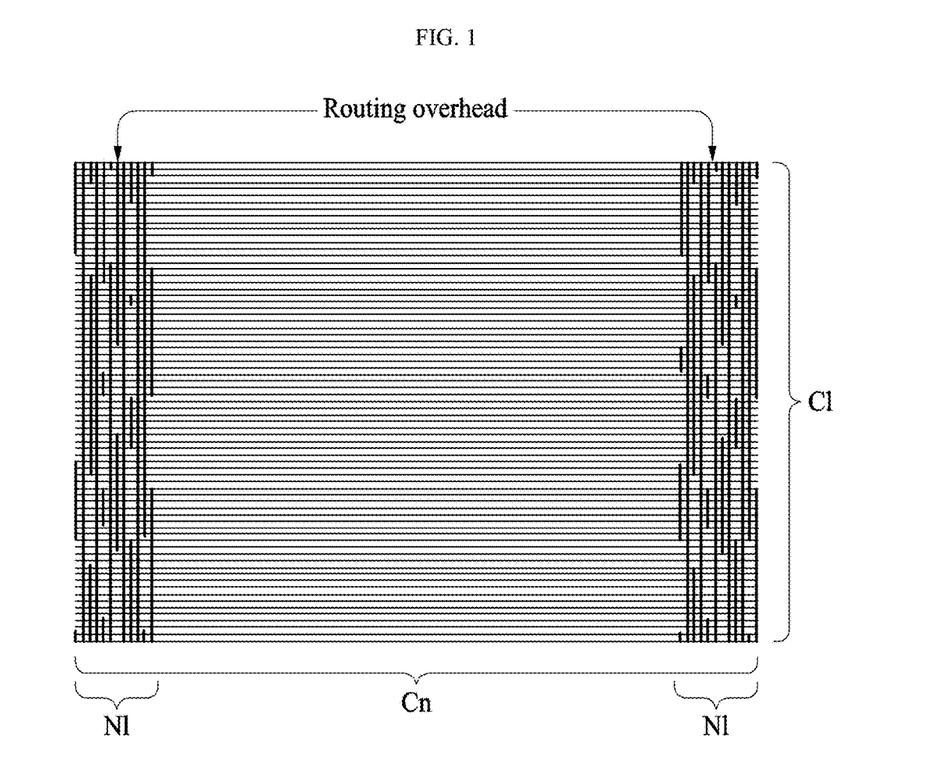
FIG. 1 is a conceptual diagram of an integrated circuit chip according to the related art.

FIG. 1 is a conceptual diagram of an integrated circuit chip according to the related art.

Figure 2:
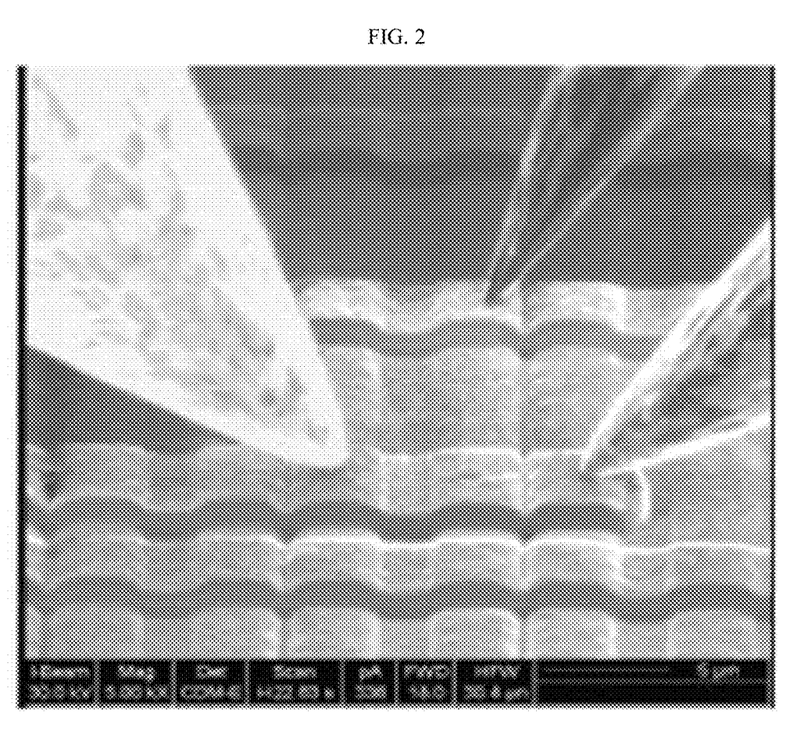
FIG. 2 is a SEM picture of an actual probe in progress.

FIG. 2 is a SEM picture of an actual probe in progress.

As illustrated in FIG. 1 and FIG. 2, a silicon chip may include a multiple number of metal lines formed in an upper layer, to prevent probe attacks aimed at reverse engineering the silicon chip, and may include routing regions formed in a lower layer, that connect with the multiple metal lines.

Signals may be sent via the multiple metal lines from one side to the other, and in the event of a probe attack, the attack can be detected from anomalies in the signals of the metal lines. As the metal lines require an input of multiple signals, routing regions that connect both ends of the metal lines are formed under the metal lines, with the integrated circuit arranged between the routing regions.

Figure 3:
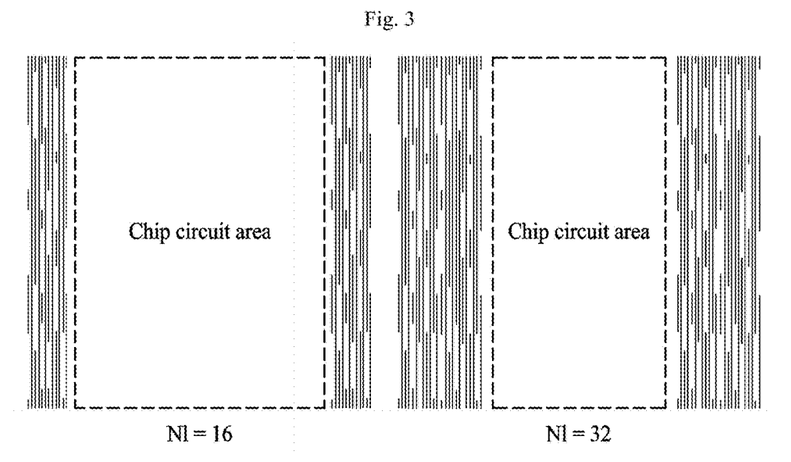
FIG. 3 illustrates the reductions in chip circuit areas caused by the routing regions.

FIG. 3 illustrates the reductions in chip circuit areas caused by the routing regions.

With recent advances in probing technology, the integrated circuit chip has become vulnerable to probe invasions aimed at reverse engineering. To prevent this and increase the security level of the chip, it may be necessary to position the metal lines more densely. However, if the metal lines are placed more densely, the areas occupied by the routing areas would be increased, as illustrated in FIG. 3 (Nl represents the number of signals), so that either the area for the integrated circuit would have to be reduced or the overall size of the chip would have to be increased.

SUMMARY

The present solution relates to an integrated circuit chip with an increased security level for preventing reverse engineering.

The present solution also related to an integrated circuit chip that can provide greater security without an increased size.

In some scenarios, the present solution provides an integrated circuit chip with reverse engineering prevention that includes: a signal generator part configured to generate a first signal; a metal line part configured to receive the first signal generated at the signal generator part and generate a second signal; a comparison logic part configured to compare the first signal generated at the signal generator part and the second signal generated at the metal line part; and a signal routing part formed on both sides of the metal line part to connect the signal generator part with the metal line part at one side and connect the metal line part with the comparison logic part at the other side, where the signal routing part is a shift register.

An integrated circuit chip with reverse engineering prevention can increase the security level of the chip itself without increasing the size of the chip or lowering the degree of integration.

Also, since there is no increase in area in spite of the increased security level of the chip, the cost increase of the chip may be reduced.

Additional aspects and advantages of the present solution will be set forth in part in the description which follows, and in part will be obvious from the description, or may be learned by practice of the present solution.

DETAILED DESCRIPTION

Descriptions of specific structures or functions relating to certain embodiments derived based on the concept of the present invention as set forth in the present specification are provided merely as examples for explaining the embodiments derived from the concept of the invention. The embodiments can be practiced in a variety of implementations and are not limited to the embodiments described herein.

As the embodiments derived from the concept of the present invention allow for various modifications and can be implemented in various forms, certain embodiments are illustrated in the drawings and described in detail in the present specification. However, this is not intended to limit the embodiments derived from the concept of the invention to the specific disclosed forms, and it is to be appreciated that all modifications, equivalents, and substitutes that do not depart from the spirit and technical scope of the present invention are encompassed in the present invention.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component.

When a component is mentioned to be "connected" or "joined" to another component, this may mean that it is directly connected or joined to the other element, but it is to be understood that yet another component may exist in-between. On the other hand, when a component is mentioned to be "directly connected" or "directly joined" to another component, it is to be understood that there are no other components in-between. The same applies to other expressions describing the relationships of components, such as "between" and "immediately between" or "neighboring" and "directly neighboring".

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms used herein, including technical or scientific terms, have the same meanings as those generally understood by those with ordinary knowledge in the field of art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

The integrated circuit chip with reverse engineering prevention according to the present solution will be described below in more detail with reference to the accompanying drawings.

Figure 4:
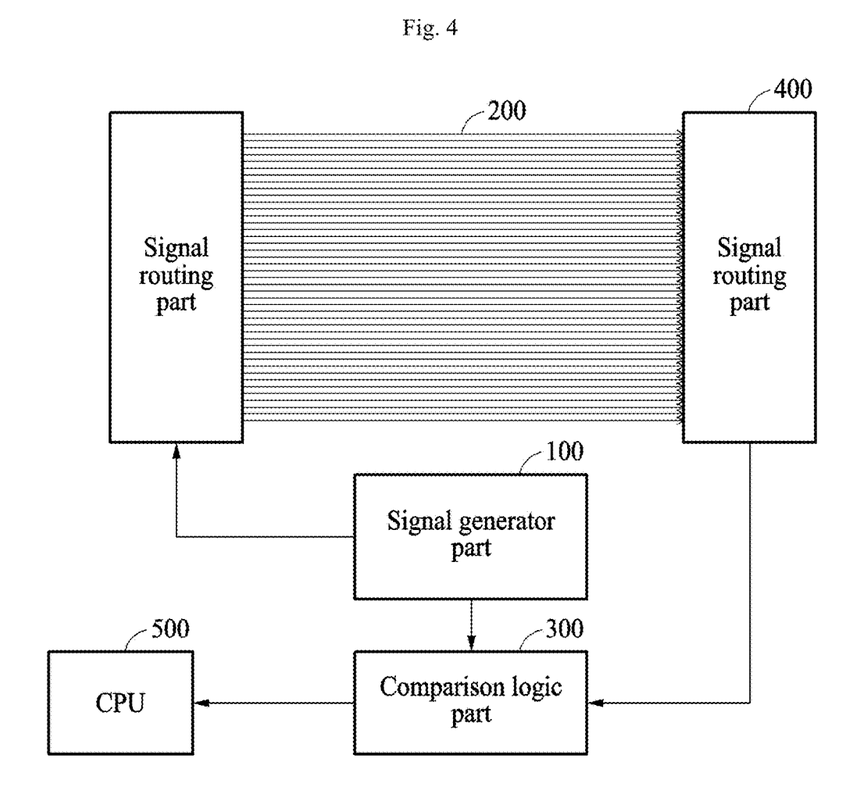
FIG. 4 is a function block diagram of an integrated circuit chip with reverse engineering prevention.

FIG. 4 is a function block diagram of an integrated circuit chip with reverse engineering prevention.

As illustrated in FIG. 4, an integrated circuit chip with reverse engineering prevention can include a signal generator part 100 configured to generate first signals, a metal line part 200 configured to receive the first signals generated at the signal generator part 100 and generate second signals, a comparison logic part 300 configured to compare the first signals generated at the signal generator part 100 and the second signals generated at the metal line part 200, and a signal routing part 400 formed on either side of the metal line part 200 to connect the signal generator part 100 with the metal line part 200 at one side and connect the metal line part 200 with the comparison logic part 300 at the other side, where the signal routing part 400 can be a shift register.

The signal generator part 100 may generate first signals. Here, a first signal can be an arbitrary digital signal and may serve as an identifier signal by which to detect external invasions that breach the metal line part 200 formed over the integrated circuit chip.

The metal line part 200 may include a multiple number of lines to protect the integrated circuit located underneath. The first signals inputted to the metal line part 200 may be outputted as second signals. Of course, if there is no external invasion at the metal line part 200, the first signals and the second signals would be identical, but if there is an external invasion, the first signals and the second signals may become different. To take advantage of this, it may be desirable to form the metal line part 200 densely for protection against probe invasions. Supposing, for example, that a chip has an overall size of 1 $mm^2$, and supposing that the number of lines overall is 1000, then a metal line part 200 can have 1000 different signals transmitted therethrough.

With 1000 different signals passing through the metal line part 200, if a probe invasion, etc., is detected, certain changes in the signals may occur in some of the lines of the metal line part 200, and such changes in the signals would result in the first signals and the second signals becoming different from each other, as described above.

The comparison logic part 300 may compare the first signals generated at the signal generator part 100 with the second signals outputted from the metal line part 200. The comparison logic part 300 may compare the first signals with their corresponding second signals to determine whether or not an external invasion has occurred, and if it is determined that an external invasion has occurred, may generate an initialize chip signal or a halt function signal and send it to the central processing unit (CPU) 500.

The central processing unit 500 may receive the initialize chip signal or the halt function signal and take measures against the detected invasion of the integrated circuit.

Figure 5:
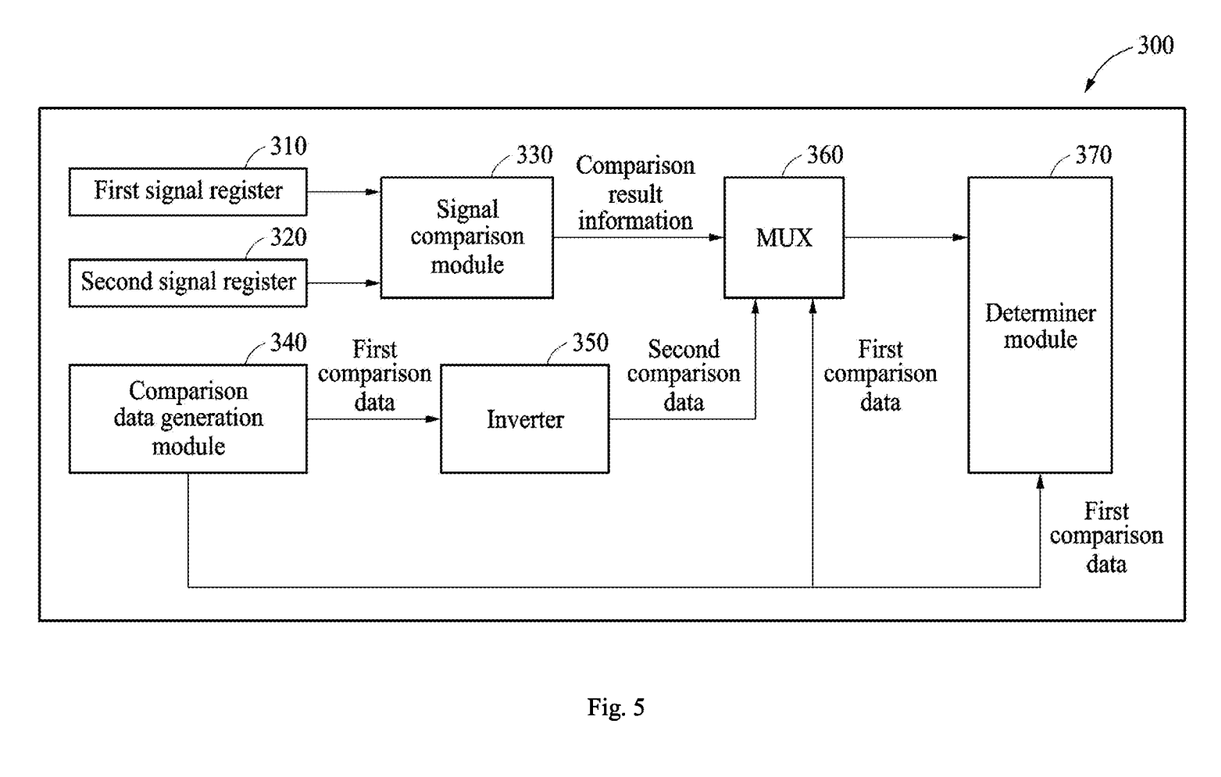
FIG. 5 is a detailed function block diagram of a comparison logic part.

FIG. 5 is a detailed function block diagram of a comparison logic part.

As illustrated in FIG. 5, the comparison logic part 300 may include a first signal register 310 that stores the first signals, a second signal register 320 that stores the second signals, a signal comparison module 330 that compares the first signals and the second signals, a comparison data generation module 340 that generates first comparison data, an inverter 350 that inverts the first comparison data to generate second comparison data, and a MUX 360 that outputs the second comparison data if the comparison result of the signal comparison module 330 shows that the first signals and the second signals are identical and outputs the first comparison data if the comparison result of the signal comparison module 330 shows that the first signals and the second signals are different.

The first signal register 310 of a comparison logic part 300 may store the first signals generated at the signal generator part 100. The second signal register 320 may store the second signals that have passed through the metal line part 200. The first signals and second signals stored in the first signal register 310 and second signal register 320 may be compared at the signal comparison module 330.

As a result of comparing the first signals and second signals at the signal comparison module 330, if the first signals and second signals are identical to each other, then this would mean that there is no probe invasion breaching the metal line part 200, whereas if the first signals and second signals are different, then this would mean a probe invasion breaching the metal line part 200 has been detected.

The comparison data generation module 340 may generate first comparison data. The comparison data generation module 340 can be an oscillator configured to generate a toggle signal or a random signal generator configured to generate a random signal. In cases where a toggle signal is generated as the first comparison data, then the inverter 350 configured to invert the first comparison data may generate another toggle signal as second comparison data with a different phase from that of the first comparison data.

The first comparison data generated at the comparison data generation module 340 can be a clock (CLK) signal for providing the results of invasion detection for each time period based on the results determined at the signal comparison module 330.

The MUX 360 may output the second comparison data if the comparison result at the signal comparison module 330 is that the first signals and the second signals are identical and may output the first comparison data if the comparison result at the signal comparison module 330 is that the first signals and the second signals are different.

The comparison logic part 300 can further include a determiner module 370, which can determine that an external invasion has occurred and generate an initialize circuit chip signal or a halt function signal, if the data inputted from the MUX 360 is the first comparison data.

Considering the data flow within the comparison logic part 300 with reference to FIG. 5, the signal comparison module 330 which compares the first signals and second signals that are inputted into the comparison logic part 300 may input comparison result information to the MUX 360. At the same time, the comparison data generation module 340 may input the first comparison data to the inverter 350, and the inverter 350 may generate the second comparison data, which includes a signal inverted from the first comparison data, and input it to the MUX 360.

The first comparison data of the comparison data generation module 340 may be transmitted to the MUX 360 and the determiner module 370 simultaneously, and the MUX 360 may determine whether to output the first comparison data to the determiner module 370 or output the second comparison data to the determiner module 370 based on comparison result information sent from the signal comparison module 330, with the first comparison data sent to the determiner module 370 if the comparison result information indicates that an invasion has been detected and the second comparison data sent to the determiner module 370 otherwise.

If the sets of comparison data arriving at the determiner module 370 are first comparison data and second comparison data, this would indicate that there was no invasion detected, and as such the processing of the integrated circuit may be kept operating normally for said time segment. However, if the sets of comparison data arriving at the determiner module 370 are first comparison data and first comparison data, this would indicate that an invasion has been detected, and the determiner module 370 may generate an initialize chip signal or a halt function signal and transmit the signal to the central processing unit (CPU) 500 as already described above.

The signal routing part 400 may be formed on both sides of the metal line part 200, with one side connecting the signal generator part 100 and the metal line part 200 and the other side connecting the metal line part 200 and the comparison logic part 300. In particular, a signal routing part 400 can be a shift register.

Also, a shift register can be a SIPO (serial-in parallel-out) shift register that receives a single set of data as input and output multiple sets of data and can also be a PIPO (parallel-in parallel-out) shift register, but is not limited thus.

Figure 6:
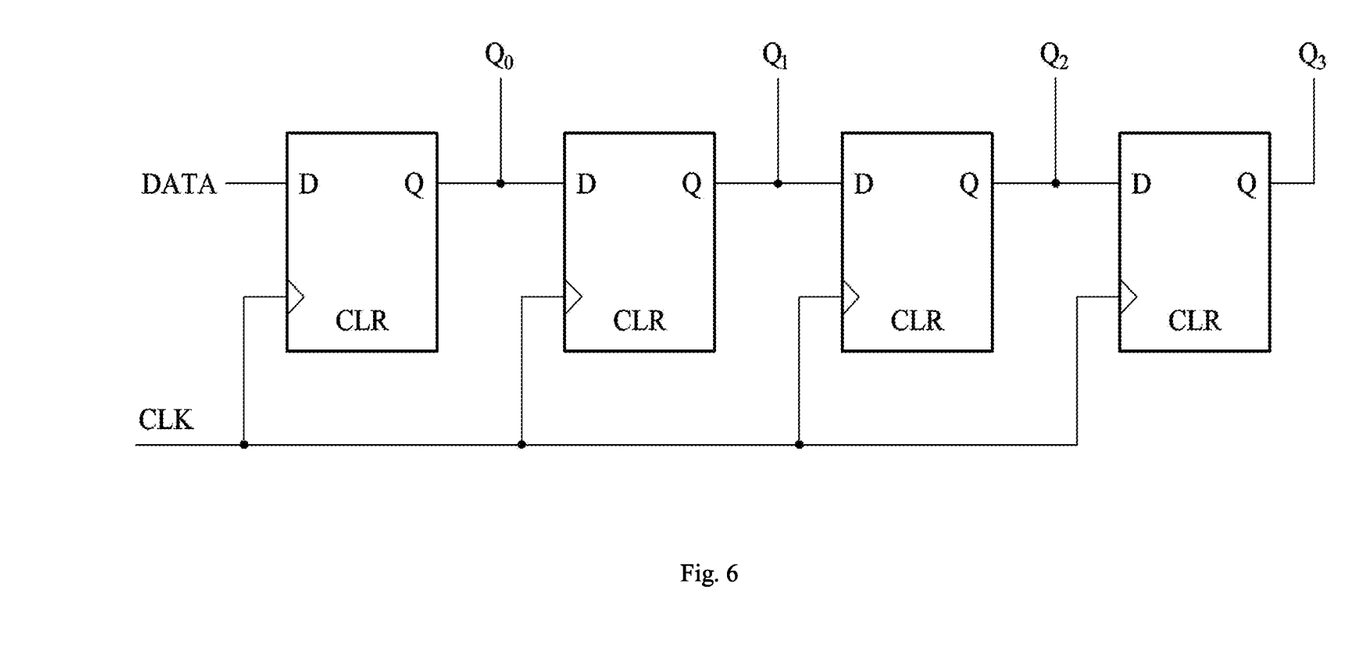
FIG. 6 is a circuit diagram of a SIPO shift register.

FIG. 6 is a circuit diagram of a SIPO shift register.

A shift register is originally a circuit used for storing data or moving data sideways, and the functions of the shift register of storing and moving data and information in a data system were eventually developed and evolved into the component known as a memory.

Figure 7:
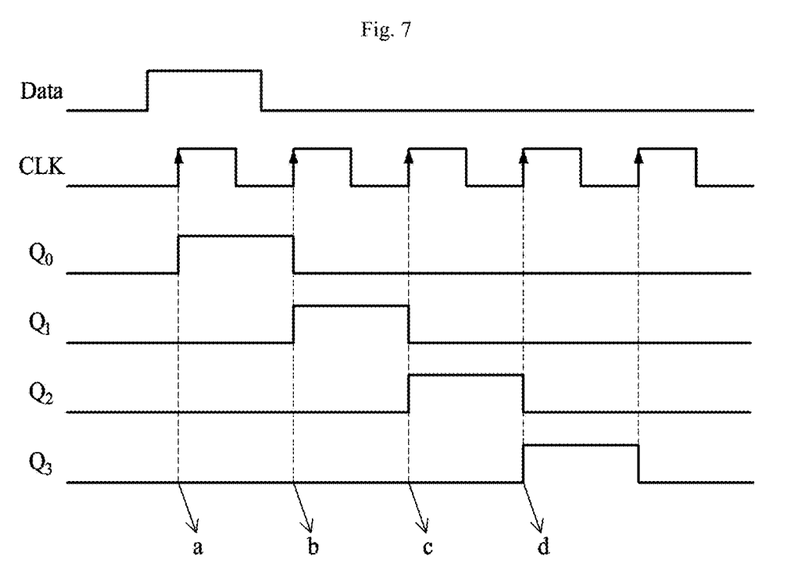
FIG. 7 is a time chart of a SIPO shift register.

FIG. 7 is a time chart of a SIPO shift register.

Looking at the operative states of a SIPO shift register in FIG. 6 and FIG. 7, a SIPO shift register is structured such that a single set of data passes through the shift register to provide multiple outputs. When data is received as input, the SIPO shift register stands by until the clock rises, and when a rising edge is detected, data is outputted to Q0 (a). When a second clock is entered, the new input entering at DATA is outputted to Q0, and the data that was stored in Q0 is outputted to Q1 (b). In this manner, the data is moved sequentially (c, d) every time a clock occurs, while the data is maintained during the period when there is no clock occurring. The SIPO shift register is a circuit having the functions described above.

By including a shift register in the signal routing part 400 of an integrated circuit chip with reverse engineering prevention, the first signals can be transferred to the metal line part 200 while the routing region used for the signal routing function remains fixed without requiring a larger area.

TABLE 1

|  | No. of Signals in the Metal Line Part (No. of Lines) (32 to 128 lines) | | | The Present Solution |
| --- | --- | --- | --- | --- |
| Nl | 32 | 64 | 128 | 1000 |
| Co | 6.4% | 12.8% | 25.6% | 0.4% |

In Table 1 above, Nl represents the number of lines or the number of signals in the metal line part 200, and Co represents the overhead of the routing regions, or in other words, the percentage of the overall chip size (1 mm$^2$) occupied by the routing regions. In cases where an internal metal layer is formed for the routing regions as in the related art (see FIG. 1), a metal line part 200 sending 32 signals would require 6.4% of the total area for the routing regions, sending 62 signals would require 12.8%, and sending 128 signals would require 25.6%, with the remaining area available for forming the integrated circuit. With the present solution, however, the area occupied by signal routing part 400 when 1000 signals are sent through the metal line part 200 is merely 0.4% of the total area, leaving a much larger area for forming the integrated circuit while at the same time increasing the level of security.

While the spirit of the invention has been described in detail with reference to specific embodiments, the embodiments are for illustrative purposes only and do not limit the invention. It is to be appreciated that many variations and equivalent embodiments can be derived by those skilled in the art without departing from the scope and spirit of the invention. The true technical scope of the invention is to be defined by the technical spirit disclosed in the appended claims.

What is claimed is:

1. An integrated circuit chip with reverse engineering prevention, the integrated circuit chip comprising:
   a signal generator part configured to generate a first signal;
   a metal line part configured to receive the first signal generated at the signal generator part and generate a second signal;
   a comparison logic part configured to compare the first signal generated at the signal generator part and the second signal generated at the metal line part; and
   two signal routing parts formed on both sides of the metal line part, the two signal routing parts comprising
      a first signal routing part formed on one side among the both sides of the metal line part, and connected to the signal generator part to receive the first signal, and
      a second signal routing part formed on the other side among the both sides of the metal line part, and connected to the comparison logic part to transfer the second signal;
   wherein the two signal routing parts are shift registers;
   wherein the comparison logic part comprises:
      a first signal register configured to store the first signal;
      a second signal register configured to store the second signal;
      a signal comparison module configured to compare the first signal with the second signal;
      a comparison data generation module configured to generate first comparison data;
      an inverter configured to generate second comparison data by inverting the first comparison data; and
      a MUX configured to output the first comparison data or the second comparison data according to a comparison result of the signal comparison module, the MUX configured to output the second comparison data if the first signal and the second signal are identical, the MUX configured to output the first comparison data if the first signal and the second signal are different.

2. The integrated circuit chip with reverse engineering prevention according to claim 1, wherein the comparison logic part compares the first signal with the second signal corresponding thereto to determine whether or not an external invasion has occurred.

3. The integrated circuit chip with reverse engineering prevention according to claim 2, wherein the comparison logic part generates an initialize circuit chip signal or a halt function signal and transmits the initialize circuit chip signal or halt function signal to a central processing unit (CPU) if it is determined that an external invasion has occurred.

4. The integrated circuit chip with reverse engineering prevention according to claim 1, wherein the comparison data generation module is an oscillator configured to generate a toggle signal or a random signal generator configured to generate a random signal.

5. The integrated circuit chip with reverse engineering prevention according to claim 1, wherein the comparison logic part further comprises:
   a determiner module configured to generate an initialize circuit chip signal or a halt function signal if data inputted from the MUX is the first comparison data.

6. The integrated circuit chip with reverse engineering prevention according to claim 1, wherein the shift register is a SIPO (serial-in parallel-out) shift register configured to receive input of a single set of data and output several sets of data.

* * * * *